Feb. 7, 1956
B. DENZLER
2,733,925
COLLET CHUCK
Filed Feb. 14, 1952
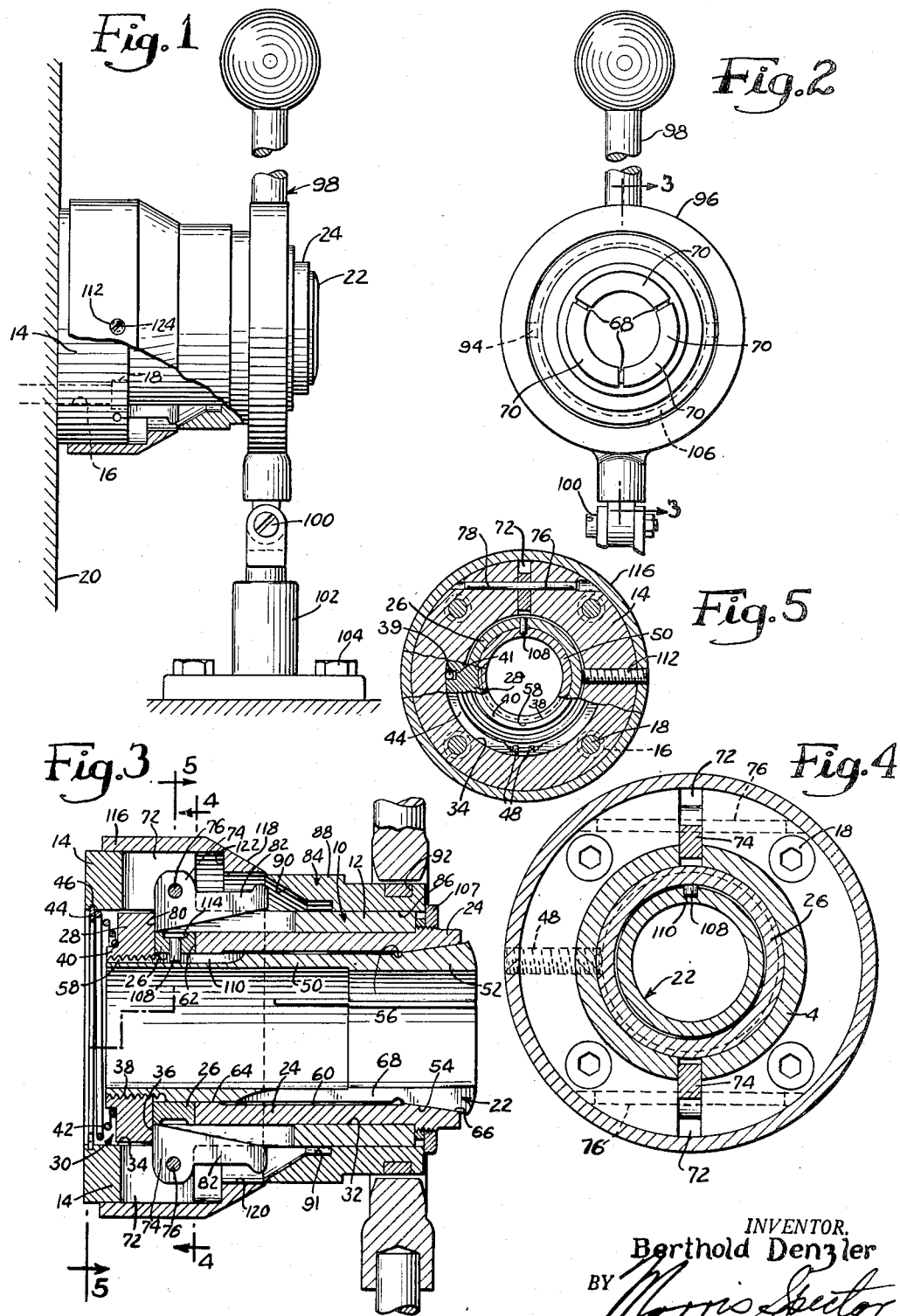
INVENTOR.
Berthold Denzler

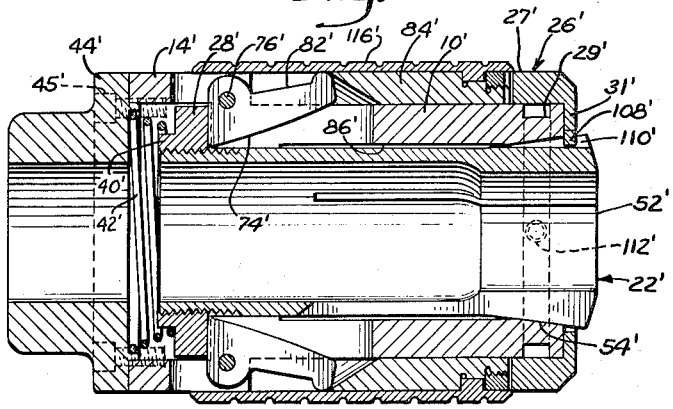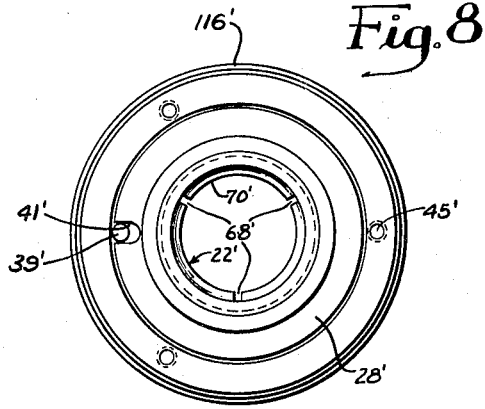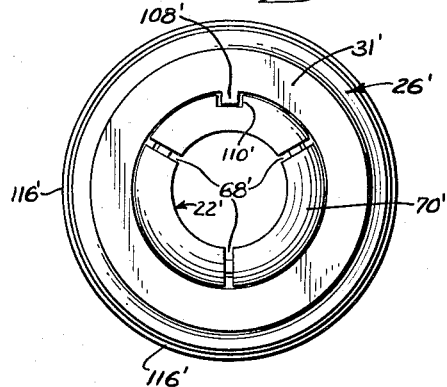

United States Patent Office 2,733,925
Patented Feb. 7, 1956

2,733,925
COLLET CHUCK

Berthold Denzler, Chicago, Ill., assignor to Davos Products Company, Chicago, Ill., a copartnership consisting of Berthold Denzler and Filip Brandhandler Application February 14, 1952, Serial No. 271,581

12 Claims. (Cl. 279—43)

The present invention relates to collet chucks and more particularly to collet chucks of the type shown and described in my prior Patent No. 2,561,788, dated July 24, 1951, for Collet Chuck, over which the present chuck is designed as an improvement.

The objects of the present invention are, in general, substantially the same as those outlined in the above-mentioned patent relating to economy of manufacture and reliability in operation, but it is a particular object of the present invention to provide a collet chuck of this type having associated therewith a removable adapter sleeve designed for reception therein of the collet proper and which is capable of having substituted therefor a similar adapter sleeve of different diameter to accommodate reception of a collet of different size and capable of handling a different workpiece, all without disturbing the normal manner of functioning of the chuck assembly as a whole.

A similar object of the invention is to provide a collet chuck of this character in which the adapter sleeve, in addition to performing its function as an adaptor, also constitutes the actual constricting sleeve employed for the purpose of compressing or constricting the collet jaws and causing them to perform their clamping action on the workpiece.

A further object of the invention is to provide a collet chuck of this type having associated therewith a collet draw ring which is shiftable axially of the chuck and which threadedly receives therein an end of the collet proper, together with novel means for locking the collet relative to the draw ring in any desired position of threaded adjustment in order to vary the effective stroke of the draw plate. In carrying out this last mentioned object, the invention contemplates the provision of a floating locking ring which is constrained to follow the rotational movements of the collet proper when the latter is threaded into or out of the draw ring and which may itself be securely locked in any desired angular position of adjustment to thereby lock the collet against further turning movement relative to the draw ring and attain a desired setting of the collet axially relative to the draw ring. By such an arrangement the more obvious expedient of utilizing set screws which might otherwise damage the collet threads is obviated.

A similar and related object of the invention in a modified form thereof is to provide a collet chuck of the type outlined above in which the floating locking ring for locking the chuck proper in any desired angular position of adjustment is disposed at the forward end of the chuck assembly in a position where it is conveniently accessible for manipulation to exert a relatively large torque leverage on the collet proper for adjusting purposes prior to locking of the ring to establish a fixed position of the chuck.

A still further object of the invention is to provide a collet chuck of the type briefly outlined above including a collet draw ring from which the collet proper is readily removable and having associated therewith means for retaining the draw ring in its assembled position within the chuck assembly after the collet has been removed from the chuck and the latter has been removed from the lathe or other machine tool with which the chuck may be associated.

A related object of the invention is to provide a collet chuck assembly in which the retaining means for the collet draw ring also constitutes a part of a spring biasing means whereby the draw ring is normally urged to its inoperative position against the action of the clutch mechanism ordinarily employed for moving the draw ring to its operative collet constricting position.

Yet another object of the invention, in a collet chuck of the character shown and described in my above-mentioned patent, is to provide a removable stop ring which, when in position in the clutch assembly, limits the movement of the clutch sleeve employed in connection with the chuck assembly in one direction, as well as preventing removal of the sleeve from its sliding support on the chuck housing.

The provision of an improved collet chuck which is relatively simple in its construction; one which is comprised of a minimum number of relatively moving parts and which is therefore unlikely to get out of order; one which is rugged and durable and which is therefore possessed of long life; and one which is positive in its action and which is otherwise well adapted to perform the services required of it, are further desirable features that have been borne in mind in the production and development of the present invention.

In the accompanying drawings forming a part of this specification, one embodiment of the invention has been disclosed.

In the drawings:

Fig. 1 is a side elevational view of a collet chuck assembly manufactured in accordance with the principles of the present invention. In this view certain parts have been broken away to more clearly reveal the nature of the invention;

Fig. 2 is a front elevational view of the chuck assembly shown in Fig. 1;

Fig. 3 is a sectional view taken substantially along the line 3—3 of Fig. 2 in the direction indicated by the arrows;

Fig. 4 is a sectional view taken substantially along the line 4—4 of Fig. 3 in the direction indicated by the arrows;

Fig. 5 is a sectional view taken substantially along the line 5—5 of Fig. 3 in the direction indicated by the arrows;

Fig. 6 is a sectional view, similar to Fig. 3, taken substantially centrally through a modified form of the chuck assembly;

Fig. 7 is a front end view of the assembly shown in Fig. 6; and

Fig. 8 is a rear end view of the chuck assembly shown in Fig. 6 with the cover and retaining plate for the draw ring removed to more clearly illustrate certain features of the invention.

In all of the above described views similar characters of reference are employed to designate similar parts throughout.

Referring now to the drawings in detail, the improved collet chuck assembly comprising the present invention involves in its general organization a chuck housing 10 including a cylindrical body portion 12 from which there projects radially outwardly a peripheral attachment or mounting flange 14 at the rear end thereof and provided with a series of spaced holes 16 designed for reception therethrough of the usual attachment bolts 18 by means of which the chuck assembly may be attached to a suitable support 20 which may be the rotatable head of a machine tool or which may be a stationary support. The cylindrical body portion 12 of the chuck housing 10 is adapted to receive therein the collet proper 22, a surrounding adapter sleeve 24, a floating locking ring 26, a draw ring 28, and a draw ring retaining assembly 30, the nature and function of which will soon be made apparent.

The chuck housing 10 is formed with a cylindrical bore 32 therein and an enlarged counterbore 34 at the rear end thereof providing a shoulder 36 (Figs. 3 and 5). The draw ring 28 is in the form of a ring-like member having a central threaded opening 38 therein surrounded by a rearwardly extending annular flange 40. The draw ring 28 is slidably disposed within the counterbore 34, in which it has a silding fit, and the forward face thereof is adapted to bear against the shoulder 36 when the draw ring is in its normal retracted position as shown in Fig. 3.

The draw ring 28 is held against rotation relative to the housing 10 by means of a pin 39 which projects forwardly from the shoulder 36 and which extends into a longitudinally extending groove 41 provided in the outer face of the draw ring.

The draw ring 28 is normally maintained in its retracted position by means of a spring 42 one end of which bears against the draw ring and the other end of which bears against a split snap ring 44 mounted within a narrow internal groove 46 provided adjacent the extreme rear end of the counterbore 34. The annular flange 40 provides a centering rib for the forward end of the spring 42 and the split ring 44 provides a seat for the other end of the spring. The groove 46 serves to prevent the ring 44 from axial tilting movement within the counterbore 34. A pair of inwardly extending fingers 48 formed at the split ends of the ring 44 provides a means whereby the ring may be engaged by a suitable contracting tool for removal of the ring from the counterbore 34.

The collet proper 22 is in the form of a cylindrical member preferably formed of hardened steel and having a body portion 50 having an enlarged head 52 at its forward end providing an annular exterior conical surface 54 which may be separated from the outer cylindrical surface of the body portion 50 by means of a shallow annular groove 56. The rear end of the collet 22 is exteriorly threaded as at 58 and the threaded portion thereof is designed for different degrees of threaded reception within the threaded opening 38 provided in the draw ring 28 for collet adjusting purposes in a manner and for a purpose that will be described presently.

The collect 2 is axially slidable within the central bore 60 of the adapter sleeve 24, the latter being in the form of a tubular member which is press fitted within the cylindrical bore 32 of the housing 10 and the rear end 62 of which terminates a slight distance forwardly of the shoulder 36 which divides the bore 32 from the counterbore 34. A shallow internal flange 64 is formed at the rear end of the adapter and bears against the body portion 50 of the collet 22 and the forward end of the adapter sleeve 24 is provided with a conical surface 66 designed for camming engagement with the exterior conical surface 54 provided on the collet 22 for collet constricting purposes in a manner that will be described presently.

The tubular collet 22 is provided with a plurality of longitudinally extending slits 68 (Figs. 2 and 3) therein which extend completely through the head 52 and rearwardly of the body portion 50 throughout a major portion of the length of the collet tube. While any number of such slits may be provided, for illustrative purposes three have been shown spaced 120° apart thus dividing the head into three jaws 70 in the usual manner of forming such collets. It will be seen, therefore, that with the collet 22 threadedly received in the opening 38 of the draw ring 28 to the desired degree, and with the draw ring bearing against the internal shoulder 36 provided in the housing 10 under the influence of the spring assembly 30, a slight space will exist between the conical surfaces 54 and 66 provided on the collet head 52 and adapter sleeve 24, respectively. Upon sliding movement of the draw ring 28 rearwardly in the counterbore 34, the entire collet proper 22 will be moved rearwardly in the adapter sleeve 24 so that the conical surface 54 of the collet 22 will be drawn against the conical surface 66 of the adapter sleeve to force the collet jaws 70 inwardly and thus contract or constrict the collet against the workpiece held therein.

Means are provided for moving the draw ring 28 axially to cause the collet jaws to grip or release the workpiece and, toward this end, a pair of diametrically opposed slots 72 are formed in the chuck housing and exist partially in the mounting flange 14 and partially in the cylindrical bore portion 12 thereof. Each slot 72 has pivotally mounted therein a clutch dog 74 carried on a pivot pin 76 extending across the slot 72. The pivot pins 76 are disposed within chordal bores 78 which are drilled in the mounting flange 14 to permit insertion of the pins 76 in position across the slots 72.

Each dog 74 is formed with a cam surface 80 designed for camming engagement with the forward face of the draw ring 28. A clutch finger 82 formed on each dog normally projects from the confines of the slot 72, as shown in Fig. 3. The fingers 82 are capable of being moved into the slot 72 in such a manner as to cause the clutch dogs 74 to be swung about the axes of its pivot pins 76 so as to cause the shoulder 80 thereof to bear against the forward face of the draw ring 28 and to move the latter rearwardly against the action of the spring 42 to draw the collet 22 rearwardly in the chuck assembly and constrict the same in the manner previously described.

Cooperating with the fingers 82 of the clutch dogs 74 is an axially shiftable clutch sleeve 84 in the form of a cylindrical member having a central bore 86 extending therethrough which is slidably received on the outer cylindrical surface of the body portion 12 of the housing 10. The sleeve 84 is formed with an offset portion 88 extending rearwardly therefrom and provided with an internal conical cam surface 90 in register with the ends of the dog fingers 82 and with an inner cylindrical surface 91. The sleeve 84 is also formed with an external annular groove 92 into which there is adapted to extend a pair of diametrically opposed fingers 94 that project inwardly from the medial ring portion 96 of an operating lever 98, the lower end of which is pivoted as at 100 to a suitable standard 102 bolted as at 104 to the machine tool or other stationary support adjacent the collect chuck. A pair of floating shoes 106 are positioned in the annular groove 92 and substantially bridge the distance between the two fingers 94.

From the above description it will be seen that swinging movement of the operating lever 98 in a counterclockwise direction as viewed in Fig. 1 about the pivotal axis 100 will cause movement of the clutch sleeve 84 to the left, thus bringing the conical bearing surface 90 thereof into engagement with the projecting fingers 82 of the clutch dog 74 and, by a camming action, retract the fingers into the slots 72 provided for them in the housing 10. Such movement of the dogs 74 will cause the shoulders 80 to bear against the forward face of the draw ring 28 and move the latter to the left as viewed in Fig. 3 against the action of the spring 42 to thus draw the collet proper 22 to the left so that the conical surfaces 54 and 66 will engage each other in a manner previously described to constrict the collet against the workpiece. As the clutch sleeve 84 moves toward its extreme left hand position as viewed in Fig. 3, the ends of the fingers 82 ride off of the conical surface 90 and onto the cylindrical surface 91, thus maintaining the fingers 82 retracted and eliminating any tendency for the spring 42 to operate through the dogs to restore the clutch sleeve 84 to its position of release.

Movement of the lever 98 in a clockwise direction will reverse the functioning of the clutch dogs 74 to relieve the pressure thereof against the forward face of the draw ring 28 to permit the spring 42 to return the draw ring to its position of engagement with the shoulder 36, thus moving the collet 22 to the right as viewed in Fig. 3 and relieving the pressure between the conical surfaces 54 and 66 to expand the collet jaws 70 by the action of their inherent resiliency.

In order to limit the forward movement of the clutch sleeve 84 on the housing 10, a stop ring 107 is threadedly received on the extreme forward end of the adapter sleeve 24 and has an overall diameter greater than the internal diameter of the clutch sleeve 84 so that the latter may bear against the ring 107 when in its forward or released position.

As previously stated, the rear end of the collet is threadedly received in the draw ring 28 and the extent of its threaded reception in the ring determines the effective stroke of the draw ring. Thus by rotating the collet 22 relative to the draw ring 28 in such a direction as to shift the collet bodily to the right as viewed in Fig. 3, the effective stroke of the draw ring 28 is lessened so that the extent of camming action between the conical surfaces 54 and 66 is reduced with a consequent diminution in the constriction of the collet when the lever 98 is moved to its operative poistion.

In order that the collet 22 may be securely held in any desired axial position of adjustment relative to the draw ring 28 the floating locking ring 26, previously mentioned, is provided and is disposed within the bore 32 of the housing 10 immediately forwardly of the shoulder 36 and directly behind the rear end 62 of the adapter sleeve 24. The ring 26 carries an inwardly projecting key in the form of a radially disposed pin 108 which extends into a longitudinally extending groove 110 provided in the rear end of the collet 22. The ring 26 is thus constrained to follow the rotational movements of the collet 22 when the latter is turned relative to the draw ring 28 for adjustment purposes. An elongated set screw 112 extends radially through the mounting flange 14 of the housing 10 and the inner end thereof is adapted to bear against the bottom surface of a shallow annular groove or trough 114 provided in the locking ring 26 when the set screw 112 is tightened thereagainst. Tightening of the set screw 112 thus locks the ring 26 in a fixed position relative to the housing 10 and thereby in turn locks the collet against turning movement relative to the draw ring 28 which itself is held against turning movement relative to the housing by means of the pin and slot connection 39 and 41 previously described. It will be seen that upon backing up of the set screw 112 the locking ring 26 will be released for rotational movement with the collet 22 and the latter may be turned relative to the draw ring 28 to any desired position of axial adjustment, after which the set screw 112 may again be tightened to lock the collet in its adjusted position. The provision of the locking ring 26 which turns bodily with the collet 22 provides a means for effectively locking the collet in position without damaging the threaded portion of the collet which would ordinarily be the case if a conventional set screw were employed and designed for engagement with the threaded portion of the collet.

A cylindrical cover sleeve 116 is telescopically received over the mounting flange 14 and is provided with a conical forward outer surface 118 and a reduced bore portion 120 providing a shoulder 122 which bears against the forward face of the mounting flange. The rear end of the offset portion 88 of the clutch sleeve 84 is adapted to extend into the bore 120 and is movable axially therein with a close fit when the clutch sleeve 84 is shifted in either direction. A hole or opening 124 is provided in the cover sleeve 116 and is designed for registry with the outer end of the set screw 112 to facilitate manipulation of the latter by insertion of a suitable tool through the opening 124.

From the above description it is thought that the construction, operation and many advantages of the herein described collet chuck will be thoroughly understood. It may be pointed out, however, that when it is desired to substitute a collet 22 of different size for accommodating different types of work, the adapter sleeve 24 may be driven or pulled from its pressed fit within the cylindrical bore 32 of the housing 10 and a different adapter sleeve having a larger or smaller internal diameter, as the case may be, may be substituted in its stead by forcing the same into the bore 32 with a pressed fit.

It will be understood that when a particular adapter has been installed within the bore 32 of the housing 10, the composite housing and adapter sleeve 24 in effect constitute a unitary chuck casing. The central bore 60 of the adapter sleeve 24 then becomes the central bore of the composite casing in which a collet 22 of selected size is slidable.

Referring now to Figures 6, 7 and 8 wherein a modified form of chuck assembly constructed in accordance with the principles of the present invention has been illustrated, this form of the invention is similar in some respects to the previously described form of the invention shown in Figures 1 to 5 inclusive, the main distinction being that the locking ring 26 together with its radially disposed locking pin 108 has been omitted and its function accomplished by the provision of a manually accessible locking ring 26' having associated therewith a locking lug 108' projecting into an axial groove 110' machined in the forward region of the collet proper 22'. The nature and function of this modified form of locking means and its relation to the collet chuck assembly will now be more fully described.

Inasmuch as the collet chuck assembly of Figures 6 to 8 inclusive possesses many features and instrumentalities in common with the chuck assembly in Figures 1 to 5 inclusive, a detailed description of this latter chuck assembly is not deemed necessary and an understanding thereof may be had by reference to Figures 6 to 8 inclusive in the drawings, wherein similar characters of reference have been applied to the corresponding parts of the two chuck assemblies.

Referring now to Figure 6, the chuck housing 10' remains substantially the same as in the form of the invention shown in Figure 3. Inasmuch as no provision for an adapter such as the adapter 24 is made in the modified form illustrated, the housing 10' and collet proper 22 are provided with cooperating mating surfaces 66' and 54' respectively, designed for camming engagement with each other when the draw ring 28' is shifted axially by the fingers 82' of the clutch dogs 74' under the control of the clutch sleeve 84'.

The draw ring 28' is normally urged in a forward direction by means of a coil spring 42' one end of which bears against the draw ring 28' and is centered thereon by means of the flange 40' and the other end of which bears against a removable retaining ring or end piece 44'. Countersunk attachment screws 45' are employed for securing the retaining ring 44' to the flanged portion 14' of the housing.

The floating locking ring 26' which has been substituted for the locking ring 26 includes a peripheral rim portion 27' which surrounds the forward end of the chuck housing 10'. A pair of diametrically opposed set screws 112' extends through the rim portion 27' and into an annular groove 29' in the forward regions of the housing 10'. An inwardly extending flange 31' is provided in the forward regions of the rim 27' and is adapted to overlie the annular front face of the housing 10'. The groove 110' extends axially through the thickened front region of the collet proper 22' and the lug 108' projects inwardly from the flange 31' and into the groove.

From the above description it will be seen that tightening of the set screws 112' will serve to lock the ring 26' in a fixed position relative to the housing 10' to thereby in turn lock the collet proper 22' against turning movement relative to the draw ring 28', which itself is held against turning movement relative to the housing by means of the pin and slot connection 39', 41' (Fig. 8), similar to the pin and slot connection 39, 41 of Fig. 5. Upon backing up of the set screws 112' the locking ring 26' will be released for rotational movement with the collet 22' and the latter may thus be turned through the medium of the ring 26' to any desired position of axial adjustment, after which the set screws 112' may again be tightened to lock the collet 22' in its adjusted position.

Because of the relatively large external diameter of the locking ring 26' relative to that of the collet proper 22' an increased degree of torque leverage may be applied to the collet through the medium of the ring 26' to effect such adjustment of the collet. The ring 26' when in position on the housing 10' limits the forward movement of the clutch sleeve 84'.

In compliance with the requirements of the patent statutes I have here shown and described a preferred embodiment of my invention. It is, however, to be understood that the invention is not limited to the precise construction here shown, the same being merely illustrative of the principles of the invention. What I consider new and desire to secure by Letters Patent is:

1. In a collet chuck assembly, a housing providing a cylindrical bore, an adapter sleeve removably but fixedly secured within said bore, a collet slidably disposed within and projecting through said sleeve, said collet having a plurality of normally expanded, yieldable and contractible jaws, cooperating cam means on said adapter sleeve and collet for contracting said jaws upon movement of the collet axially and rearwardly within said sleeve, a draw ring slidably disposed within said bore rearwardly of the sleeve, means for preventing turning movement of said draw ring in said bore, the rear end of said collet being threaded into said draw ring whereby rotational turning movement of the collet relative to said adapter sleeve will effect axial movement of the collet relative to the draw ring, cam means carried by said housing for engaging said draw ring and moving the latter rearwardly in said sleeve to contract the jaws of said collet, and means for locking said collet against rotational turning movement relative to the draw ring in any desired position of adjustment with respect thereto.

2. In a collet chuck assembly, a housing providing a cylindrical bore, an adapter sleeve removably but fixedly secured within said bore, a collet slidably disposed within and projecting through said sleeve, said collet having a plurality of normally expanded, yieldable and contractible jaws, cooperating cam means on said adapter sleeve and collet for contracting said jaws upon movement of the collet axially and rearwardly within said sleeve, a draw ring slidably disposed within said bore rearwardly of the sleeve, means for preventing turning movement of said draw ring in said bore, the rear end of said collet being threaded into said draw ring whereby rotational turning movement of the collet relative to said adapter sleeve will effect axial movement of the collet relative to the draw ring, cam means carried by said housing for engaging said draw ring and moving the latter rearwardly in said sleeve to contract the jaws of said collet, a locking ring disposed within said bore and surrounding said collet, means constraining said locking ring to follow the rotational movements of the collet while permiting relative axial movement therebetween, and means for releasably holding said locking ring against rotation in said bore.

3. In a collet chuck assembly, a housing providing a cylindrical bore, an adapter sleeve removably but fixedly secured within said bore, a collet slidably disposed within and projecting through said sleeve, said collet having a plurality of normally expanded, yieldable and contractible jaws, cooperating cam means on said adapter sleeve and collet for contracting said jaws upon movement of the collet axially and rearwardly within said sleeve, a draw ring slidably disposed within said bore rearwardly of the sleeve, means for preventing turning movement of said draw ring in said bore, the rear end of said collet being threaded into said draw ring whereby rotational turning movement of the collet relative to said adapter sleeve will effect axial movement of the collet relative to the draw ring, cam means carried by said housing for engaging said draw ring and moving the latter rearwardly in said sleeve to contract the jaws of said collet, a locking ring disposed within said bore and surrounding said collet, means constraining said locking ring to follow the rotational movements of the collet while permitting relative axial movement therebetween, and a set screw extending through said housing and having its inner end in register with said locking ring and designed for engagement with the latter for holding the same against rotational turning movement in said bore to thereby lock said collet against turning movement relative to said draw ring.

4. In a collet chuck assembly, a casing providing a cylindrical bore and an enlarged counterbore in communication therewith rearwardly thereof and accessible through an opening in the rear of the casing, a collet slidably disposed within and projecting through said bore, said collet having a plurality of normally expanded yieldable contractible jaws, cooperating cam means on said casing and collet for contracting said jaws upon movement of the collet axially and rearwardly within said bore, a draw ring slidably disposed within said counterbore, means detachably securing the rear end of said collet to said draw ring for movement of the collet and ring in unison, cam means carried by said casing for engaging said draw ring and moving the latter rearwardly in said counterbore to contract said jaws, means providing an internal groove in the defining walls of said counterbore, a snap ring disposed within said groove which prevents axial tilting thereof, and a coil spring disposed within said counterbore and bearing at one end against said snap ring and embracing a centering neck on said draw ring at the other end and bearing against a shoulder on said draw ring and serving to normally urge the draw ring forwardly in the counterbore.

5. In a collet chuck assembly, a housing providing a cylindrical bore, a collet slidably disposed within and projecting through said bore, said collet having a plurality of normally expanded, yieldable and contractible jaws, cooperating cam means on said housing and collet for contracting said jaws upon movement of the collet axially and rearwardly within said bore, a draw ring slidably disposed within said bore rearwardly of the housing, means for preventing turning movement of said draw ring in said bore, the rear end of said collet being threaded into said draw ring whereby rotational turning movement of the collet relative to said adapter sleeve will effect axial movement of the collet relative to the draw ring, cam means carried by said housing for engaging said draw ring and moving the latter rearwardly in said sleeve to contract the jaws of said collet, a locking ring having a rim portion surrounding said housing, means constraining said locking ring to follow the rotational movements of the collet while permitting relative axial movement therebetween and means for releasably holding said locking ring against rotation on said housing.

6. In a collet chuck assembly, a housing providing a cylindrical bore, a collet slidably disposed within and projecting through said bore, said collet having a plurality of normally expanded, yieldable and contractible jaws, cooperating cam means on said housing and collet for contracting said jaws upon movement of the collet axially and rearwardly within said bore, a draw ring slidably disposed within said bore rearwardly of the housing, means for preventing turning movement of said draw ring in said bore, the rear end of said collet being threaded into said draw ring whereby rotational turning movement of the collet relative to said housing will effect axial movement of the collet relative to the draw ring, cam means carried by said housing for engaging said draw ring and moving the latter rearwardly in said bore to contract the jaws of said collet, a locking ring having a rim portion surrounding said housing and an inwardly extending flange forwardly of said housing, there being an axially extending groove formed in one of said collet jaws, a lug projecting inwardly from said flange and extending into said groove, there being an annular groove formed in said housing exteriorly thereof and a set screw extending through the rim portion of said locking rim and into said annular groove for locking the ring, and consequently the collet, in any desired position against turning movement relative to the housing.

7. In a collet chuck assembly, a casing providing a cylindrical bore and an enlarged counterbore in communication therewith rearwardly thereof, a collet slidably disposed within and projecting through said bore, said collet having a plurality of normally expanded yieldable contractible jaws, cooperating cam means on said casing and collet for contracting said jaws upon movement of the collet axially and rearwardly within said bore, a draw ring slidably disposed within said counterbore, said draw ring being internally threaded, the rear end of said collet being externally threaded and threadedly received within said draw ring for axial adjustment relative thereto upon relative turning movement between the collet and draw ring, means preventing rotational turning movement of said draw ring within said counterbore, and means for locking said collet in any selected position of adjustment relative to the draw ring, said locking means comprising a locking ring having a rim portion surrounding said housing, means constraining said locking ring to follow the rotational movements of the collet while permitting relative axial movement therebetween, and means for releasably holding said locking ring against rotation on said housing.

8. In a collet chuck assembly, a casing providing a cylindrical bore and an enlarged counterbore in communication therewith rearwardly thereof, a collet slidably disposed within and projecting through said bore, said collet having a plurality of normally expanded yieldable contractible jaws, cooperating cam means on said casing and collet for contracting said jaws upon movement of the collet axially and rearwardly within said bore, a draw ring slidably disposed within said counterbore, said draw ring being internally threaded, the rear end of said collet being externally threaded and threadedly received within said draw ring for axial adjustment relative thereto upon relative turning movement between the collet and draw ring, means preventing rotational turning movement of said draw ring within said counterbore, and means for locking said collet in any selected position of adjustment relative to the draw ring, said locking means comprising a locking ring having a rim portion surrounding said housing and an inwardly extending flange forwardly of said housing, there being an external axially extending groove formed in said collet, a lug projecting inwardly from said flange and extending into said groove, and a set screw extending through the rim portion of said locking rim for locking the ring, and consequently the collet, in any desired position against turning movement relative to the housing.

9. In a collet chuck assembly, a housing providing a bore, a collet slidably disposed within said bore, said collet having a plurality of normally expanded, yieldable and contractible jaws, cooperating cam means associated with said housing and collet for contacting said jaws upon movement of the collet axially and rearwardly within said housing, a draw ring slidably disposed within said bore, means for preventing turning movement of said draw ring in said bore, one end of said collet being threaded into said draw ring whereby rotational turning movement of the collet relative to said housing will effect axial movement of the collet relative to the draw ring, means carried by said housing for engaging said draw ring and moving the latter rearwardly in said housing to contract the jaws of said collet, and means for locking said collet against rotational turning movement relative to the draw ring in any desired position of adjustment with respect thereto.

10. In a collet chuck assembly, a housing providing a bore, a collet slidably disposed within said bore, said collet having a plurality of normally expanded, yieldable and contractible jaws, cooperating cam means associated with said housing and collet for contracting said jaws upon movement of the collet axially and rearwardly within said housing, a draw ring slidably disposed within said bore, means for preventing turning movement of said draw ring in said bore, one end of said collet being threaded into said draw ring whereby rotational turning movement of the collet relative to said housing will effect axial movement of the collet relative to the draw ring, means carried by said housing for engaging said draw ring and moving the latter rearwardly in said housing to contract the jaws of said collet, a locking ring adjacent to said collet, means constraining said locking ring to follow the rotational movements of the collet while permitting relative axial movement therebetween, and means for releasably holding said locking ring against rotation.

11. In a collet chuck assembly, a housing providing a bore, a collet slidably disposed within said bore, said collet having a plurality of normally expanded, yieldable and contractible jaws, cooperating cam means associated with said housing and collet for contracting said jaws upon movement of the collet axially and rearwardly within said housing, a draw ring slidably disposed within said bore, means for preventing turning movement of said draw ring in said bore, one end of said collet being threaded into said draw ring whereby rotational turning movement of the collet relative to said housing will effect axial movement of the collet relative to the draw ring, means carried by said housing for engaging said draw ring and moving the latter rearwardly in said housing to contract the jaws of said collet, a locking ring adjacent to said collet, means constraining said locking ring to follow the rotational movements of the collet while permitting relative axial movement therebetween, and a set screw extending into said housing and having one end in engagement with said locking ring for holding the same against rotational turning movement to thereby lock said collet against turning movement relative to said draw ring.

12. In a collet chuck assembly, a housing providing a bore, a collet slidably disposed within said bore, said collet having a plurality of normally expanded, yieldable and contractible jaws, cooperating cam means associated with said housing and collet for contracting said jaws upon movement of the collet axially and rearwardly within said housing, a draw ring slidably disposed within said bore, means for preventing turning movement of said draw ring in said bore, one end of said collet being threaded into said draw ring whereby rotational turning movement of the collet relative to said housing will effect axial movement of the collet relative to the draw ring, means carried by said housing for engaging said draw ring and moving the latter rearwardly in said housing to contract the jaws of said collet, a locking ring adjacent to said collet, one of said collet and locking ring having a projection which fits into an axial slot in the other of said members thereby constraining the locking ring to follow the rotational movement of the collet while permitting relative axial movement therebetween, and means for releasably holding the locking ring against rotation.

References Cited in the file of this patent

UNITED STATES PATENTS

| | | |
|---|---|---|
| 1,535,048 | Schumer | Apr. 21, 1925 |
| 1,864,786 | Wilkins | June 28, 1932 |
| 2,311,258 | Sjogren | Feb. 16, 1943 |
| 2,561,788 | Denzler | July 24, 1951 |
| 2,585,747 | Denzler | Feb. 12, 1952 |